(12) United States Patent
Chan et al.

(10) Patent No.: US 10,499,719 B2
(45) Date of Patent: Dec. 10, 2019

(54) PORTABLE ELECTRONIC DEVICE CASE

(71) Applicant: Pioneer Square Brands, Inc., Seattle, WA (US)

(72) Inventors: Jaimie Emerald Chan, Renton, WA (US); Michael Cooper Ferren, Seattle, WA (US)

(73) Assignee: PIONEER SQUARE BRANDS, INC., Mclean, VA (US)

( * ) Notice: Subject to any disclaimer, the term of this patent is extended or adjusted under 35 U.S.C. 154(b) by 148 days.

(21) Appl. No.: 15/870,946

(22) Filed: Jan. 13, 2018

(65) Prior Publication Data

US 2019/0216196 A1 Jul. 18, 2019

(51) Int. Cl.
| | | |
|---|---|---|
| *A45C 13/02* | (2006.01) | |
| *H04B 1/3888* | (2015.01) | |
| *A45C 11/00* | (2006.01) | |
| *A45F 5/00* | (2006.01) | |

(52) U.S. Cl.
CPC .............. *A45C 13/02* (2013.01); *A45C 11/00* (2013.01); *H04B 1/3888* (2013.01); *A45C 2011/002* (2013.01); *A45C 2011/003* (2013.01); *A45C 2013/025* (2013.01); *A45F 2005/006* (2013.01)

(58) Field of Classification Search
CPC ........ A45C 2011/003; A45C 2011/002; A45C 13/02
USPC ....................................... 206/320; 190/13 C
See application file for complete search history.

(56) References Cited

U.S. PATENT DOCUMENTS

| | | | | |
|---|---|---|---|---|
| 6,648,139 | B2 * | 11/2003 | Fisher, Jr. ............. | G06F 1/1626 206/320 |
| 6,892,880 | B2 * | 5/2005 | Nieves .................... | A45C 11/00 206/305 |
| 7,778,026 | B2 * | 8/2010 | Mitchell .................. | A45C 9/00 206/522 |
| 7,886,903 | B1 * | 2/2011 | Wurzelbacher, Jr. ....................... G06F 1/1616 206/320 | |
| 8,428,664 | B1 * | 4/2013 | Wyers .................... | F16M 13/04 455/575.1 |
| 2008/0017541 | A1 * | 1/2008 | Kittayapong .......... | A45C 11/00 206/521 |
| 2011/0278885 | A1 * | 11/2011 | Procter ............... | B60R 11/0235 297/135 |

FOREIGN PATENT DOCUMENTS

GB          861265       *  2/1961

* cited by examiner

*Primary Examiner* — Sue A Weaver
(74) *Attorney, Agent, or Firm* — Grandview Law

(57) ABSTRACT

Systems and methods are involved with but are not limited to a display case portion including an interior surface; and a tensional retention assembly including a tensional member, a first clip, a second clip, and the tensional member including a first end and a second end, the first clip coupled to the first end of the tensional member and the second clip coupled to the second end of the tensional member, the tensional member configured to be stretched from a first length to a second length longer than the first length wherein tensional forces are thereby applied to the first clip and the second clip. In addition to the foregoing, other aspects are described in the claims, drawings, and text forming a part of the present disclosure.

16 Claims, 7 Drawing Sheets

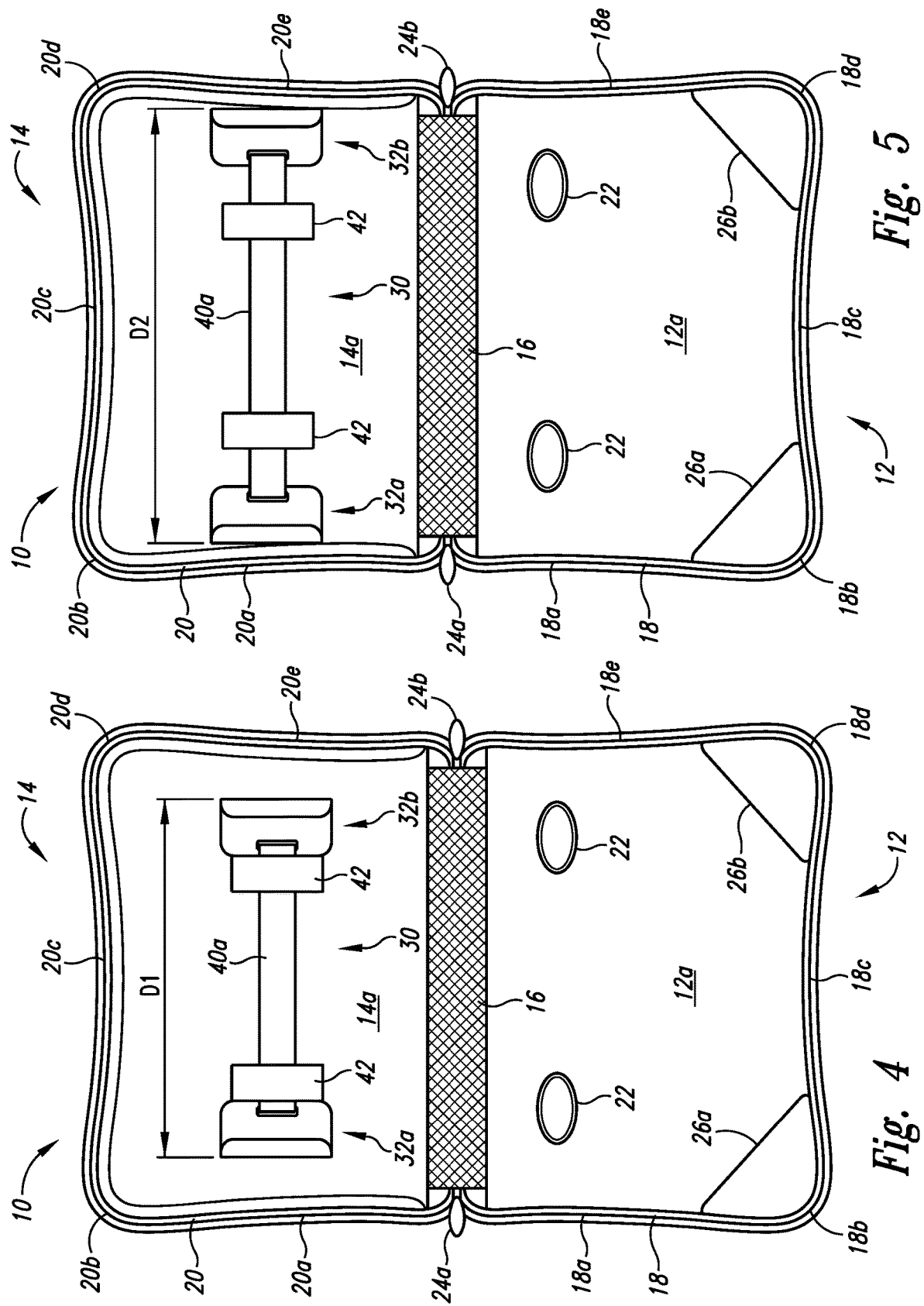

PORTABLE ELECTRONIC DEVICE CASE

SUMMARY

In one aspect, an apparatus includes, but is not limited to a display case portion including an interior surface; and a tensional retention assembly including a tensional member, a first clip, a second clip, and the tensional member including a first end and a second end, the first clip coupled to the first end of the tensional member and the second clip coupled to the second end of the tensional member, the tensional member configured to be stretched from a first length to a second length longer than the first length wherein tensional forces are thereby applied to the first clip and the second clip. In addition to the foregoing, other aspects are described in the claims, drawings, and text forming a part of the present disclosure. Other aspects are described in the claims, drawings, and text forming a part of the disclosure set forth herein.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of disparate material outsole based articles of manufacture, compositions of matter, systems for producing and/or methods for producing same that may provide context, for instance, in introducing one or more processes and/or devices described herein.

FIG. 4 is a top plan view of portable device case of FIG. 1 with first implementation of the tensional retaining assembly in a contracted position.

FIG. 5 is a top plan view of portable device case of FIG. 1 with first implementation of the tensional retaining assembly in an expanded position.

DETAILED DESCRIPTION

Figure 1:
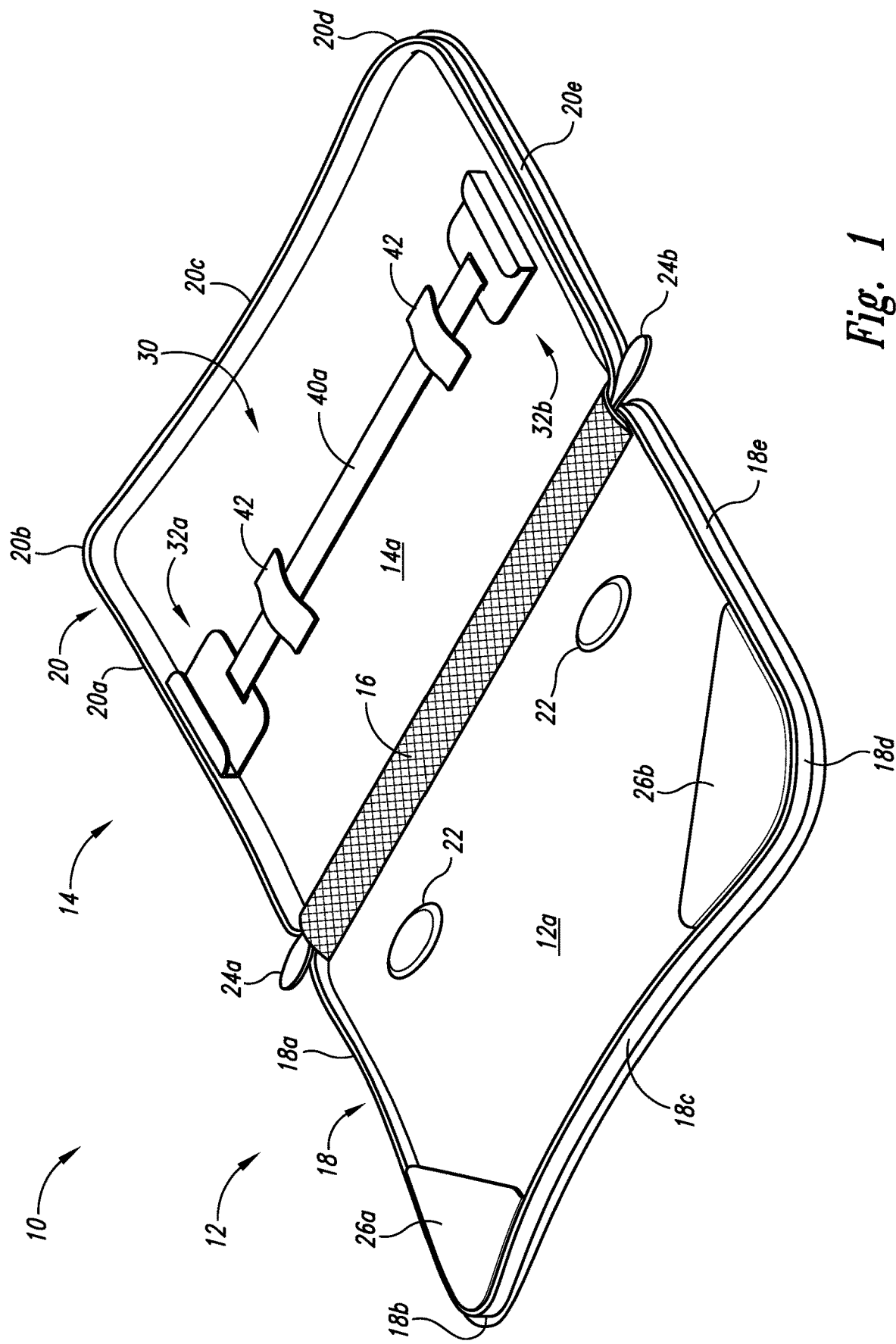
FIG. 1 is an interior perspective view of a portable device case having a first implementation of a tensional retaining assembly, the portable device case in a flat-open disposition without containing an exemplary laptop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Conventional cases for portable electronic devices such as laptops can use straps and other securing means that can cause obstructions and be visually and tactilely displeasing. Conventional cases also may not stay secured to laptops when in both closed and open positions.

Referring now to FIG. 1, a first embodiment of portable device case 10 is depicted from an interior perspective view in a flat-open disposition and as having keyboard case portion 12 having interior surface 12a and display case portion 14 having interior surface 14a with a flexible hinge-like portion 16 positioned there betwixt to allow for axially oriented motion of keyboard case portion 12 and display case portion 14 relative therebetween. As shown, interior surface 12a is bordered by hinge-like portion 16 and zippered edge 18, which includes left-side 18a, left-corner 18b, front-side 18c, right-corner 18d, and right-side 18e. Interior surface 14a is bordered by hinge-like portion 16 and zippered edge 20, which includes left-side 20a, left-corner 20b, front-side 20c, right-corner 20d, and right-side 20e. Affixed, joined, glued, stitched, as-one-piece, or otherwise extending from interior surface 12a are rests 22, which provide an amount of spacing between a received portable electronic device resting upon rests 22 and interior surface 12a. Some implementations of rests 22 may also provide a certain degree of friction-based retention of a received portable electronic device.

Affixed, joined, glued, stitched, as-one-piece, or otherwise extending from left-side 18a, left-corner 18b, and front-side 18c of zippered edge 18 is left-corner-holder material 26a, which is positioned above interior surface 12a to allow for a corner of a portable electronic device, such as a corner of a keyboard portion of a laptop, to be slid therebetween. Affixed, joined, glued, stitched, as-one-piece, or otherwise extending from front-side 18c, right-corner 18d, and right-side 18 of zippered edge 18 is right-corner-holder material 26b, which is positioned above interior surface 12a to allow for another corner of a portable electronic device, such as another corner of a keyboard portion of a laptop, to be slid therebetween.

Further shown in FIG. 1, tensional retension assembly 30 includes left channeled clip 32a and right channeled clip 32b coupled on either end of tensional member 40a depicted as an elastic band or other springy material. As such, tensional member 40a is capable of stretching, when applied forces are put on both of its ends in opposite directions away from its center, from a contracted length to an extended length longer than the contracted length. When in its extended length, the tensional member consequently provides tensional forces that oppose those applied forces that caused it to stretch from a contracted length to an extended length.

These tensional forces help to secure left channeled clip 32a and right channeled clip 32b in engaging with a display portion of a portable electronic device. Left channeled clip 32a and right channeled clip 32b can be made from polypropylene, other hard, bendable plastic, or other such material. Straps 42 can be affixed, joined, glued, stitched, or otherwise extend from interior surface 14a to movably couple tensional member 40a to interior surface 14a by allowing tensional member 40a to slide between each strap 42 and interior surface 14a while keeping tensional member 40a coupled to interior surface 14a. Straps 42 can be made from inflexible material, such as webbing, and can be sewn into case wall underneath interior surface 14a to limit movement of tensional member 40a within portable electronic case 10.

Figure 2:
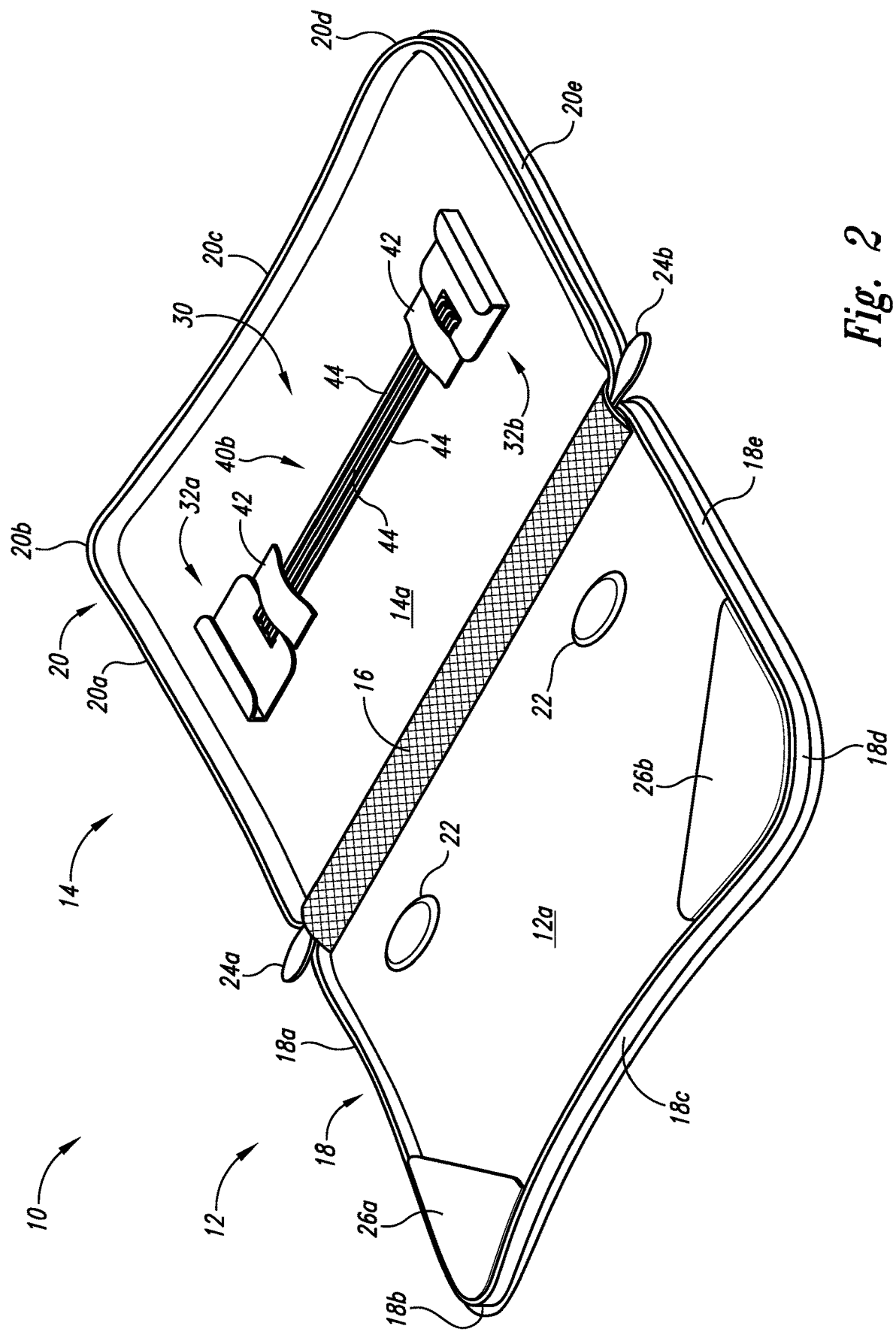
FIG. 2 is an interior perspective view of portable device case having a second implementation of the tensional retaining assembly, the portable device case in a flat-open disposition without containing an exemplary laptop.

Turning now to FIG. 2, another embodiment of portable device case 10 is depicted in FIG. 2 as having left-corner-holder material 26a affixed, joined, glued, stitched, as-one-piece, or otherwise extending from left-side 18a and front-side 18c of zippered edge 18. Left-corner-holder material is positioned above interior surface 12a to allow for a corner of a portable electronic device, such as a corner of a keyboard portion of a laptop, to be slid therebetween. Affixed, joined, glued, stitched, as-one-piece, or otherwise extending from front-side and right-side 18 of zippered edge 18 is right-corner-holder material 26b, which is positioned above interior surface 12a to allow for another corner of a portable electronic device, such as another corner of a keyboard portion of a laptop, to be slid therebetween. Tensional retension assembly 30 includes left channeled clip 32a and right channeled clip 32b coupled on either end of tensional member 40b depicted as several elastic cords 44, or alternatively, several springs, or other springy material. Straps 42 can be affixed, joined, glued, stitched, or otherwise extend from interior surface 14a to movably couple, as coupling means, tensional member 40b to interior surface 14a by allowing tensional member 40b to slide between each strap 42 and interior surface 14a while keeping tensional member 40a coupled to interior surface 14a.

Figure 3:
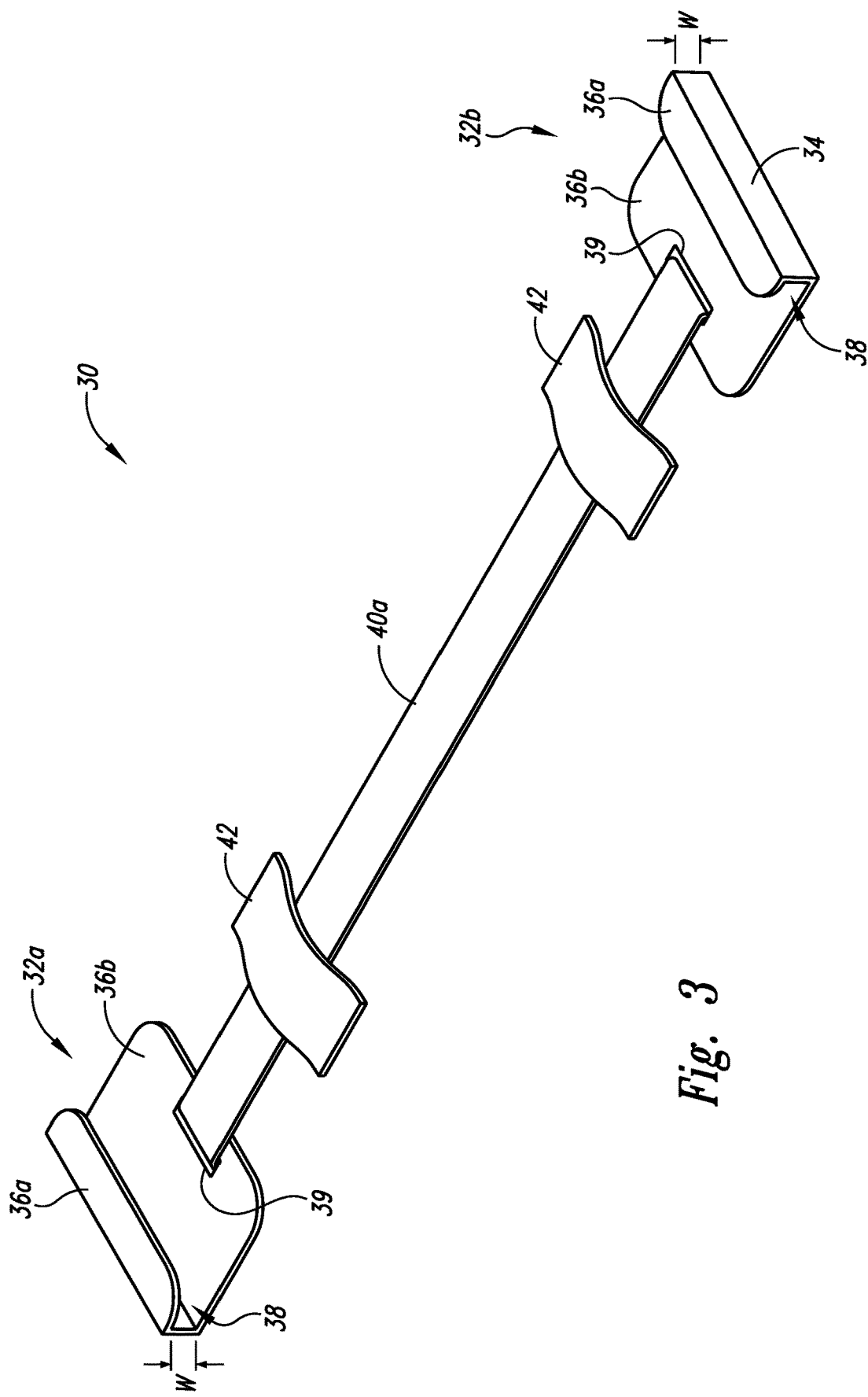
FIG. 3 is an enlarged-isolated perspective view of first implementation of the tensional retaining assembly of FIG. 1.

As further shown in FIG. 3, left channeled clip 32a and right channeled clip 32b are depicted as each having spine 34 of width "w" with first-side wall 36a and second-side wall 36b extending therefrom thereby forming slot 38 sized to receive an edge portion of a portable electronic device display. First-side wall 36a extends from spine 34 an extent dependent upon bevel width of the portable electronic device display involved. Second-side wall 36b generally extends farther from spine 34 since second-side wall 36b is positioned adjacent a back-non-display surface of the portable electronic device display involved and also to allow for ample material to provide slot-holes 39 for tensional member 40a to be coupled therewith.

As to FIG. 4, tensional retension assembly 30 is shown with tensional member 40a in a contracted state with a contracted length, D1, between left channeled clip 32a and right channeled clip 32b. This contracted state could typically exist when a portable electronic device is not being contained by portable device case 10. As to FIG. 5, tensional retension assembly 30 is shown with tensional member 40a in an extended state with an extended length, D2, between left channeled clip 32a and right channeled clip 32b. This extended postion could typically exist when there is portable electronic device being contained by portable device case 10.

Figure 6:
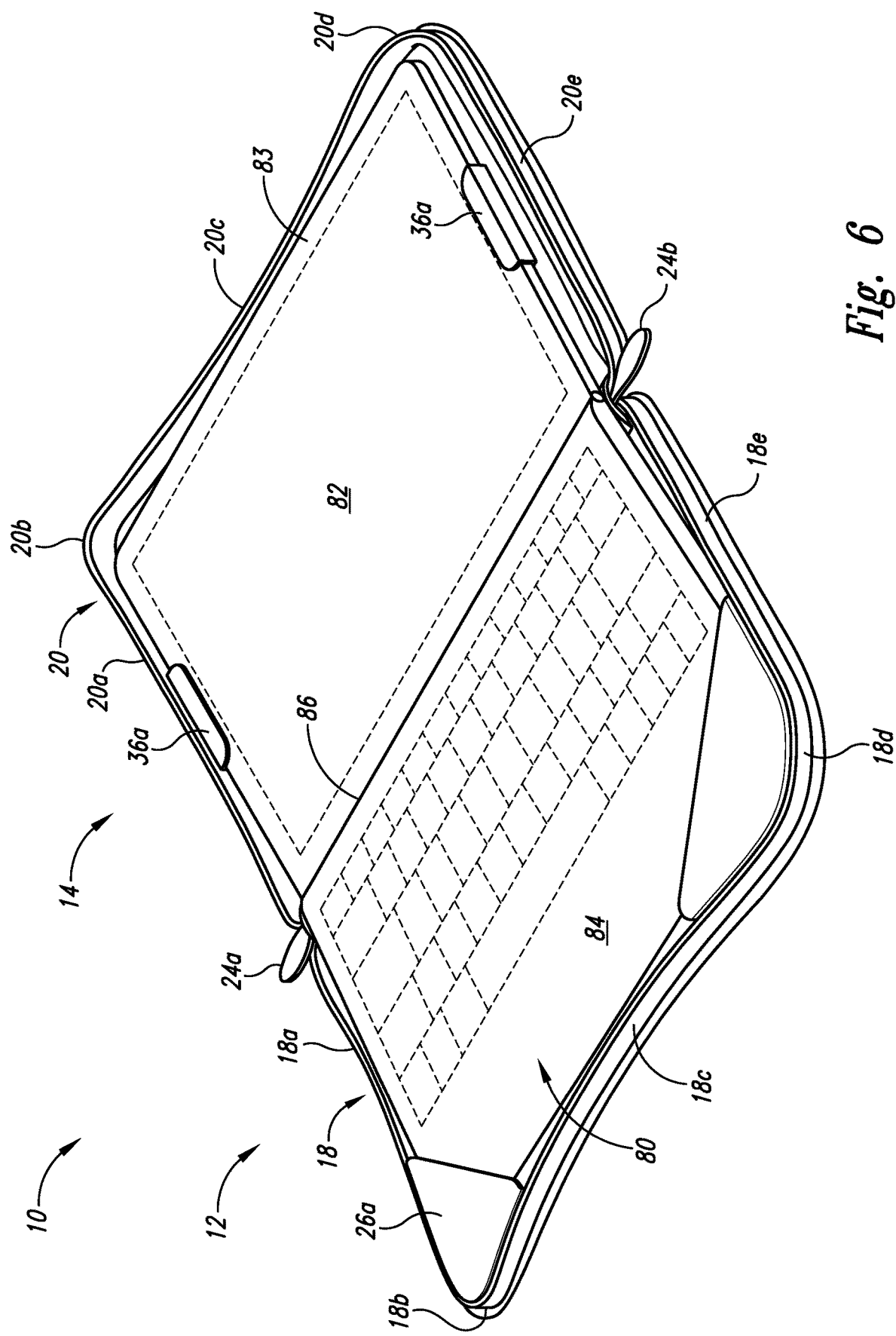
FIG. 6 is an interior perspective view of portable device case in flat-open disposition shown containing an exemplary laptop.
Figure 7:
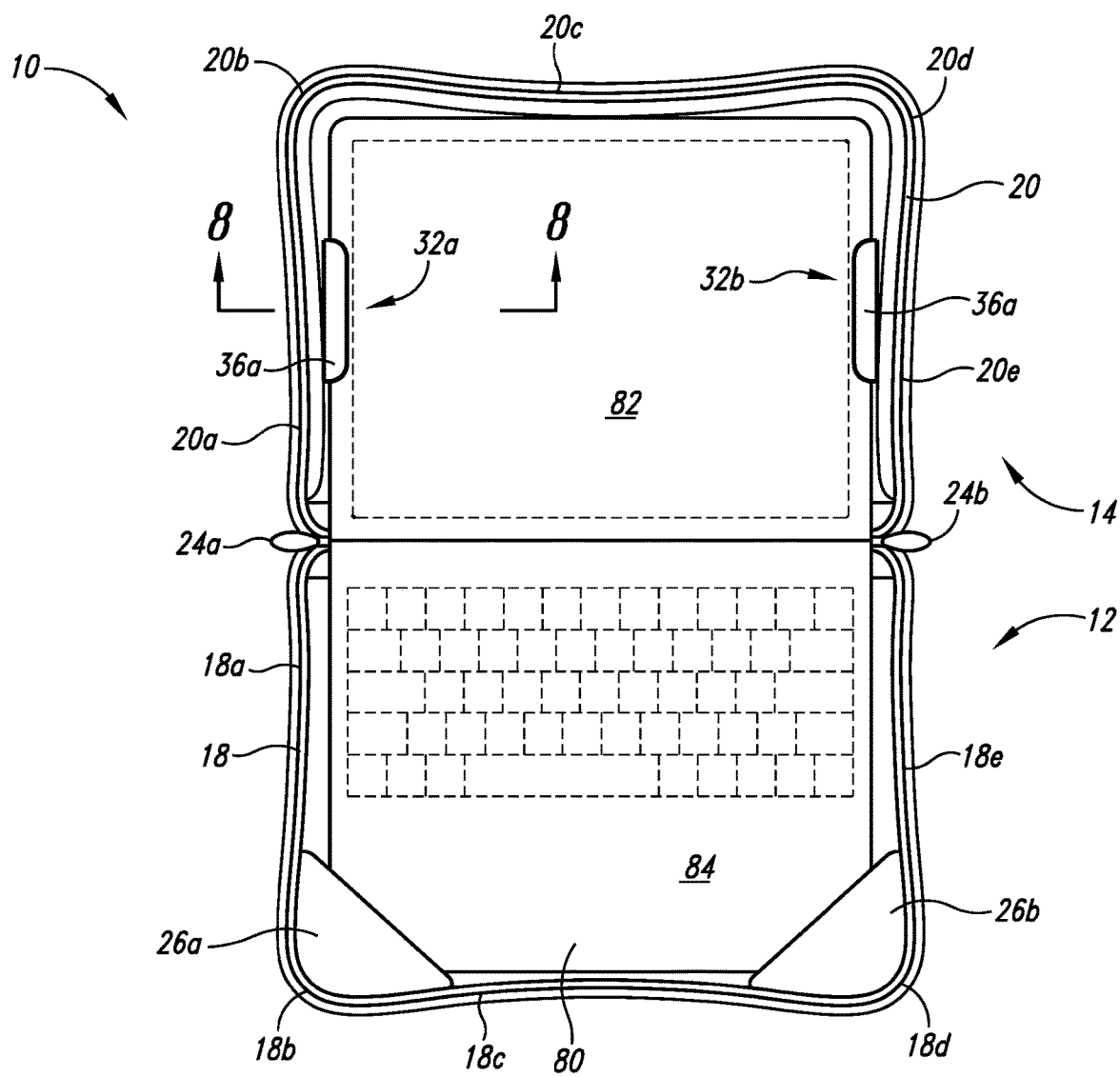
FIG. 7 is top plan view of portable device case in the flat-open disposition shown containing an exemplary laptop.

Turning now to FIGS. 6 and 7, portable device case 10 is shown containing an exemplary portable electronic device depicted as exemplary laptop 80 with its display portion 82 held by tensional retention assembly 30 of case 10, its keyboard portion 84 being held between left-corner-holder material 26a and interior surface 12a of case 10, and between right-corner-holder material 26b and interior surface 12a of case 10, and its hinged portion 86 resting upon hinge-like portion 16 of case 10. Also shown, first-side walls 36a of left channeled clip 32a and right channeled clip 32b are sized so as not to extend past bezel 83 of display portion 82 of exemplary laptop 80 so as not to block any part of images being displayed by display portion 82. When used together under tensional forces of tensional member 40a, as tensional means, when stretched from its contracted length, D1 to its extended length, D2, left channeled clip 32a and right channeled clip 32b can, as engaging means, firmly grab, to couple with, display portion 82 of exemplary laptop 80 (or other rectangularly shaped portion of similar thickness of a portable electronic device) to secure such display portion 82 within the interior of portable device case 10. Through use of its tensional member 40a, tensional retention assembly 30 can allow for various widths of portable electronic devices to be retained therewith. Furthermore left channeled clip 32a, right channeled clip 32b, and tensional member 40a can allow for ready replacement or removable from portable device case 10 if desired.

Figure 8:
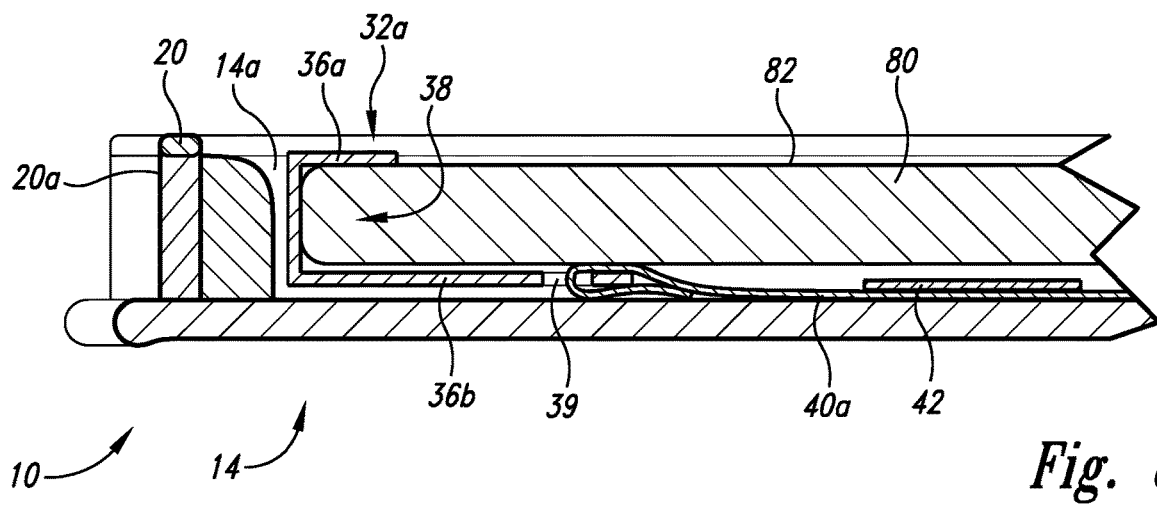
FIG. 8 is an elevational cross-sectional view of portable device case shown containing an exemplary laptop.
Figure 9:
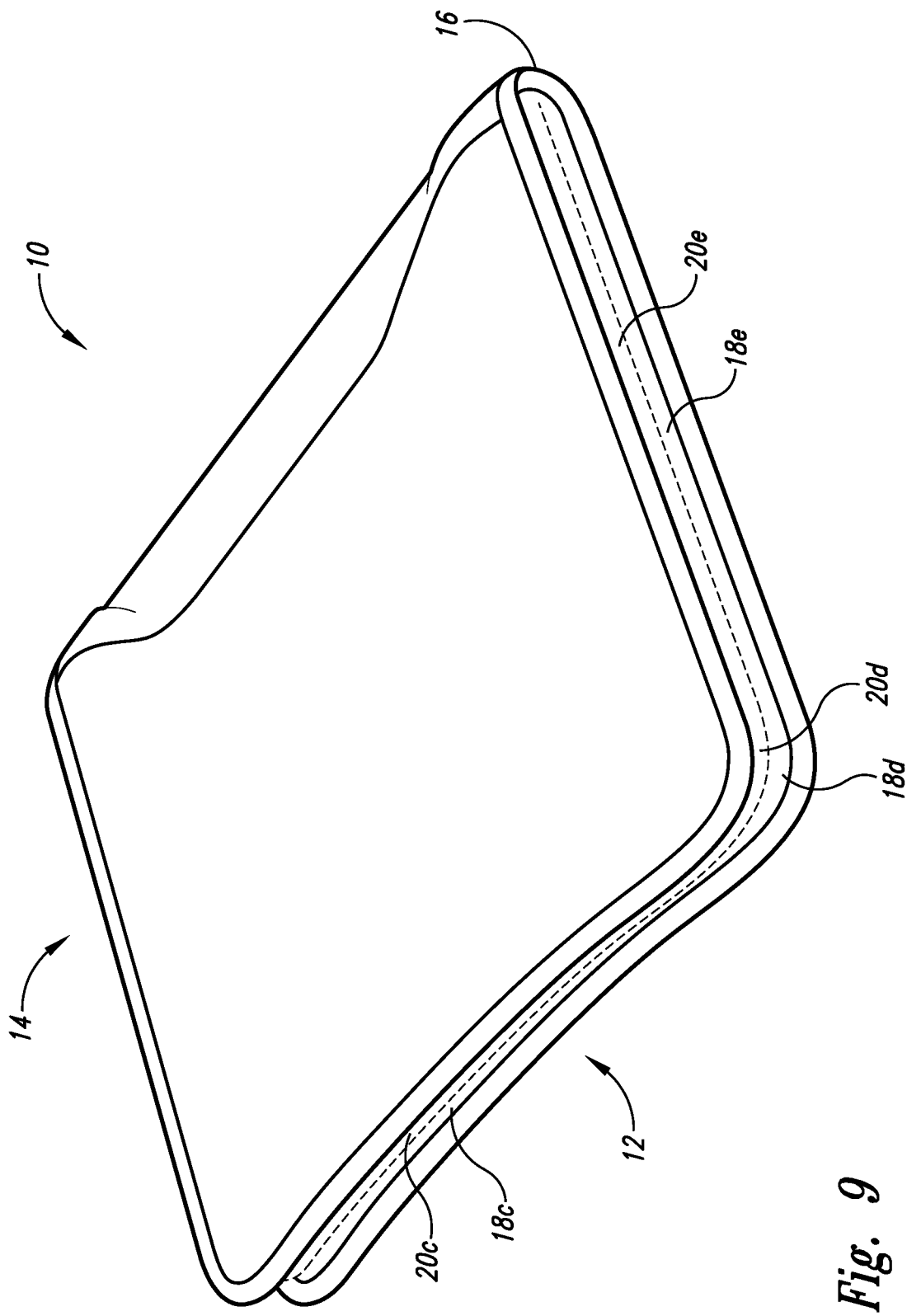
FIG. 9 is an exterior perspective view of portable device case shown in a closed disposition.

Referring to FIG. 8, display portion 82 of exemplary laptop 80 is further shown being retained by tensional retention assembly 30 with channel-left clip 32a shown engaging with display portion 82 and tensional member 40a positioned between interior surface 12a and strap 42. Furthermore, FIG. 9 depicts an exterior perspective view of portable device case 10 shown in a closed disposition.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device case comprising:
a display case portion including an interior surface;
a tensional retention assembly including a tensional member, a first clip, and a second clip, the tensional member including a first end and a second end, the first clip coupled to the first end of the tensional member and the second clip coupled to the second end of the tensional member, the tensional member configured to be stretched from a first length to a longer second length wherein tensional forces are thereby applied to the first clip and the second clip;
a keyboard case portion hingedly coupled to the display case portion; and
a first strap and a second strap, the first strap coupled to a first portion of the interior surface of the display case portion, a first portion of the tensional member positioned between a portion of the first strap and a first portion of the interior surface, the second strap coupled to a second portion of the interior surface of the display case portion, a second portion of the tensional member positioned between a portion of the second strap and a second portion of the interior surface.

2. The portable electronic device case of claim 1 wherein the tensional member comprises one or more elastic bands.

3. The portable electronic device case of claim 1 wherein the tensional member comprises one or more elastic cords.

4. The portable electronic device case of claim 1 wherein the first clip includes a spine, a first wall, and a second wall, the first wall and the second wall extending from the spine thereby forming a slot and wherein the second clip includes a spine, a first wall, and a second wall, the first wall and the second wall of the second clip extending from the spine of the second clip thereby forming a slot of the second clip.

5. The portable electronic device case of claim 4 wherein the slot of the first clip is sized to receive a first portion of a display of a portable electronic device and the slot of the second clip is sized to receive a second portion of the display of the portable electronic device.

6. The portable electronic device case of claim 4 wherein the first side wall of the first clip is sized to extend no further than a bezel of a display of a portable electronic device when the first clip of the first clip is engaged with a first portion of the display of the portable electronic device and wherein the first side wall of the second clip is sized to extend no further than the bezel of the display of the portable electronic device when the second clip is engaged with a second portion of the display of the portable electronic device.

7. The portable electronic device case of claim 1 wherein the first clip and the second clip are made of a plastic material.

8. The portable electronic device case of claim 1, wherein the keyboard case portion further comprises an interior surface, a zippered edge, and a corner holder material, the zippered edge including a first side, a second side, and a corner therebetween, the corner holder material positioned above the interior surface and extending from the first side, second side, and the corner of the zippered edge.

9. The portable electronic device case of claim 1, wherein the keyboard case portion further comprises an interior surface, and one or more rests, the one or more rests extending from the interior surface thereby providing spacing between the interior surface and a portion of a planar surface in contact with the one or more rests.

10. A portable electronic device case comprising:
a display case portion including an interior surface;
a tensional retention assembly including a tensional member, a first clip, a second clip, and the tensional member including a first end and a second end, the first clip coupled to the first end of the tensional member and the second channel clip coupled to the second end of the tensional member;
a keyboard case portion hingedly coupled to the display case portion; and
a first strap and a second strap, the first strap coupled to a first portion of the interior surface of the display case portion, a first portion of the tensional member positioned between a portion of the first strap and a first portion of the interior surface, the second strap coupled to a second portion of the interior surface of the display case portion, a second portion of the tensional member positioned between a portion of the second strap and a second portion of the interior surface.

11. The portable electronic device case of claim 10 wherein the tensional member comprises one or more elastic bands.

12. The portable electronic device case of claim 10 wherein the tensional member comprises one or more elastic cords.

13. The portable electronic device case of claim 10 wherein the first clip includes a spine, a first wall, and a second wall, the first side wall and the second side wall extending from the spine thereby forming a slot and wherein the second clip includes a spine, a first wall, and a second wall, the first side wall and the second side wall of the second clip extending from the spine of the second clip thereby forming a slot of the second clip.

14. The portable electronic device case of claim 13 wherein the slot of the first clip is sized to receive a first portion of a display of a portable electronic device and the slot of the second clip is sized to receive a second portion of the display of the portable electronic device.

15. The portable electronic device case of claim 13 wherein the first side wall of the first clip is sized to extend no further than a bezel of a display of a portable electronic device when the first clip of the first clip is engaged with a first portion of the display of the portable electronic device and wherein the first side wall of the second clip is sized to extend no further than the bezel of the display of the portable electronic device when the second clip is engaged with a second portion of the display of the portable electronic device.

16. The portable electronic device case of claim 10, wherein the keyboard case portion further comprises an interior surface, a zippered edge, and a corner holder material, the zippered edge including a first side, a second side, and a corner therebetween, the corner holder material positioned above the interior surface and extending from the first side, second side, and the corner of the zippered edge.

* * * * *